United States Patent

[11] 3,623,455

[72] Inventors William E. Kelley
 Euclid;
 Vernon C. Goldizen, Cleveland Heights, both of Ohio
[21] Appl. No. 796,882
[22] Filed Feb. 5, 1969
[45] Patented Nov. 30, 1971
[73] Assignee Aquarium Systems, Inc.
 Wickliffe, Ohio
 Continuation-in-part of application Ser. No. 641,481, May 26, 1967, now abandoned. This application Feb. 5, 1969, Ser. No. 796,882

[54] ARTIFICIAL SEA WATER SOLUTION AND COMPOSITION FOR MAKING THE SAME
 8 Claims, No Drawings
[52] U.S. Cl. .................................................... 119/3, 119/5
[51] Int. Cl. ................................................ A01k 61/00
[50] Field of Search ........................................ 99/2, 2 I, 3, 1; 119/3, 5

[56] References Cited
 OTHER REFERENCES

Segedi et al., Article in U.S. Dept. of the Interior Publication, " Sea-Water Systems for Experimental Aquariums," Fish & Wildlife Service, Bureau of Sport Fisheries & Wildlife, Research Report 63, 1964, pp. 17– 19

*Primary Examiner*—Raymond N. Jones
*Assistant Examiner*—James R. Hoffman
*Attorney*—Oberlin, Maky, Donnelly & Renner

ABSTRACT: An artificial sea water solution and a solid composition for making such a solution by dissolving in water. The solution may include, in addition to water, the following ions: sodium, magnesium, calcium, potassium, strontium, manganese, lithium, aluminum, rubidium, zinc, ferric, cobalt, copper, chloride, sulfate, carbonate, borate, orthophosphate, molybdate, thiosulfate, bromide, iodide and ethylene diamine tetra-acetic acid.

ARTIFICIAL SEA WATER SOLUTION AND COMPOSITION FOR MAKING THE SAME

This application is a continuation-in-part of application Ser. No. 641,481, filed May 26, 1967 now abandoned.

This invention relates generally as indicated to an artificial sea water solution and to compositions for making such a solution, and more particularly relates to an artificial sea water solution which is satisfactory not only for the live culture of marine fish but also invertebrates such as anemones, octopuses and brittle stars.

The use of artificial or synthetic sea water is extremely old, dating back at least as far as about 1854, when Gosse experimented with simple mixtures of available chemicals for use in marine aquariums when natural sea water was inaccessible. The composition of such mixtures and other similar mixtures used in the early days generally comprised only the four major salts found in natural sea water. The solutions formed when such compositions were dissolved in water required an inoculation of sea weed or some similar living organism to make them suitable for the more delicate forms of marine life, such as invertebrates. Such solutions, even when so inoculated, however, have met with only limited success and acceptance, primarily due to the inability to maintain successfully the invertebrate marine life.

The principal reason for the failure of the previously known compositions is believed to reside primarily in the approach taken to the problem, as it has generally been considered necessary to provide as close a facsimile as possible to actual sea water. The difficulty and the complexity of this task are enormous, however, since the oceans are believed to contain most of the naturally occurring elements known to man. Moreover, including the hydrogen and oxygen combined in the molecules of water, only 14 of the elements occur in concentrations of at least 1 part per million, with most of the elements occurring at considerably less than 1 part per million.

In more recent times, it has been attempted to provide a more suitable composition by producing the artificial medium in which the marine animals would best be maintained, regardless of how closely such medium resembles the composition of naturally occurring sea water. In achieving a suitable composition, the actual composition of sea water was, of course, used as a general guide in the formulation. It was recognized, however, that because sea water is so complex and therefore so extremely difficult to duplicate, it might be advisable to concentrate more on the needs of the various animals and to produce a composition and solution which would fulfill these needs. In achieving this result, the invertebrates present the major problems in that some are considerably more sensitive to the composition of the culture medium, and thus need different ingredients to be maintained successfully. It has been found, that invertebrates may be successfully cultured if the artificial composition includes some of the "trace" elements, i.e., the elements which are present in only minute quantities in naturally occurring sea water (less than 1 part per million). However, not all of such elements are required or desired, and not in the same quantities or ratios as found in naturally occurring sea water.

Compositions of this type have been used with considerable success, but have had several practical disadvantages. For example, the material for such compositions have been available in four separate and distinct parts which must be intermixed to form a single solution, which considerably complicates packaging and handling as well as the dissolving of the various parts to form the complete solution.

To overcome such disadvantages, a two-part composition has been proposed, Ser. No. 423,604 of William E. Kelley et al., filed Jan. 5, 1965 now abandoned. Such composition has been used with remarkable success. Further research in this area, however, has shown that certain types of plant and animal life require additional substances if they are to be maintained satisfactorily for extended periods of time. For example, the presence of ferric ions in the solution has been found to promote the growth of nitrifying bacteria, which assist in controlling the pH of the solution and oxidize toxic nitrogen compounds excreted by animals being cultured in the solution. Similarly, it has been discovered that borate ions are required by some plant life, for example, brown algae, to be maintained successfully. Borate ions have also been found to assist in buffering and controlling the pH of the solution.

It has also been discovered that vanadium ions in the solution are beneficial. The presence of a small quantity of such ions, such as about 0.02 p.p.m., enables certain families of tunicates to be maintained successfully over extended periods of time.

The inclusion of such ions in an artificial sea water solution, however, is not effected as simply as might be believed, due primarily to the complexity of the solution. For example, the pH of the solution must be maintained within carefully controlled limits if the captive marine life is to survive. Since the presence of additional ions in such solution affects these requirements, the quantity thereof must be very carefully controlled.

Moreover, it has been found that ferric ions at the pH at which the solution will normally be maintained (approximately 8.0 to about 8.3) tend to react with hydroxide and carbonate ions and precipitate out of solution very rapidly. Consequently, it is necessary to provide a way in which the ferric ions can be maintained in solution.

It is an object of this invention, therefore, to provide an artificial sea water solution and compositions for making such a solution, which is highly successful in the culture and maintenance of various forms of marine life over extended periods of time.

It is an additional object of this invention to provide an artificial sea water solution which may include the desirable borate, vanadium and ferric ions in solution, and to provide compositions from which such a solution can be made.

Yet another object of this invention is to provide an artificial sea water solution and compositions for making such a solution which are capable of use in any existing aquarium culture system.

Other objects, features and advantages of this invention will become apparent to those skilled in the art after a reading of the following more detailed description.

The improved artificial sea water of this invention is an aqueous solution containing, in one formulation, the following ions in the indicated concentration.

| Ion | Concentration, p.p.m. |
| --- | --- |
| Cl | 18,400 |
| Na | 10,200 |
| $SO_4$ | 2,500 |
| Mg | 1,200 |
| K | 370 |
| Ca | 370 |
| $HCO_3$ | 140 |
| $H_3BO_3$ | 25 |
| Br | 20 |
| Sr | 8 |
| $PO_4$ | 1 |
| Mn | 1 |
| $MoO_4$ | 0.7 |
| $S_2O_3$ | 0.4 |
| Li | 0.2 |
| Rb | 0.1 |
| I | 0.07 |
| EDTA | 0.05 |
| Al | 0.04 |
| Zn | 0.02 |
| V | 0.02 |
| Co | 0.01 |
| Fe | 0.01 |
| Cu | 0.003 |

To produce the sea water solution, the necessary materials are furnished in convenient form. One example is a composition consisting of two separate parts. The first part is a relatively homogeneous mixture of solid basic salts in comminuted form and the second part is a concentrated solution in water of the balance of the necessary materials.

One preferred formulation of the aforenoted two-part composition is set forth in the following table.

TABLE I.—MAJOR INGREDIENTS

| Compound | Formula | Percent by weight | Amount (grams)[1] |
|---|---|---|---|
| Sodium chloride | NaCl | 65.2 | 9,770.9 |
| Magnesium sulfate | $MgSO_4 \cdot 7H_2O$ | 16.3 | 2,442.7 |
| Magnesium chloride | $MgCl_2 \cdot 6H_2O$ | 12.8 | 1,911.7 |
| Calcium chloride | $CaCl_2 \cdot 2H_2O$ | 3.26 | 488.5 |
| Potassium chloride | KCl | 1.74 | 260.2 |
| Sodium hydrogen carbonate | $NaHCO_3$ | .50 | 74.3 |
| Boric acid | $H_3BO_3$ | .062 | 9.31 |
| Strontium chloride | $SrCl_2 \cdot 6H_2O$ | .047 | 7.02 |
| Manganese sulfate | $MnSO_4 \cdot H_2O$ | .009 | 1.40 |
| Sodium orthophosphate, mono-H | $Na_2HPO_4 \cdot 7H_2O$ | .009 | 1.40 |
| Lithium chloride | LiCl | .002 | .35 |
| Sodium molybdate | $Na_2MoO_4 \cdot 2H_2O$ | .002 | .35 |
| Sodium thiosulfate | $Na_2S_2O_3 \cdot 5H_2O$ | .002 | .35 |
| Totals | | 99.933 | 14,968.47 |

TRACE ELEMENTS

| Compound | Formula | Percent by weight | Amount (grams)[1] | Amount times 25[2] |
|---|---|---|---|---|
| Potassium bromide | KBr | .072 | 10.795 | 269.89 |
| Aluminum sulfate[3] | $Al_2(SO_4)_3 \cdot 18H_2O$ | .0012 | .180 | 4.5 |
| Rubidium chloride | RbCl | .00040 | .060 | 1.5 |
| Zinc sulfate | $ZnSO_4 \cdot 7H_2O$ | .00026 | .0384 | .96 |
| Potassium iodide | KI | .00024 | .036 | .9 |
| Sodium ferric ethylene diamine tetra-acetic acid | EDTA NaFe | .00019 | .029 | .725 |
| Vanadyl sulfate | $VOSO_4 \cdot 2H_2O$ | .00016 | .024 | .6 |
| Cobalt sulfate | $CoSO_4 \cdot 7H_2O$ | .00013 | .020 | .5 |
| Copper sulfate | $CuSO_4 \cdot 5H_2O$ | .000027 | .004 | .1 |
| Totals | | .074607 | 11.1864 | 279.675 |
| Grand totals | | 100.007607 | 14,979.6564 | |

[1] Amount to make 100 gallons of artificial sea water.
[2] Use amount times 25 of the trace elements and mix with 4 liters distilled water for a trace element stock solution. Sufficient for 25 100 gallon batches of sea water.
[3] Requires heat to dissolve.

One procedure employed for obtaining the sea water solution from the composition is as follows. The required amounts of the basic salts are placed in a suitable mixing tank, and a hard stream of tap water is directed into them to dissolve the chemicals. Additional water is added to fill the container to the level of the desired specific gravity of the solution, with the total amount of water being, for example, 100 gallons. As indicated by the foregoing table, a small amount of sodium thiosulfate has been included which neutralizes the chlorine usually present in tap water, as otherwise the residual chlorine will displace the ionic bromine and iodine as these have a lower position in the electromotive series.

A stock solution of trace elements is then prepared, preferably using liquid stock solutions of the various ingredients to facilitate assembly of the solution and to give better quantitative accuracy, since this permits the weighing out of relatively larger amounts of the individual solutions. Aluminum sulfate is dissolved by heat which is conveniently achieved prior to mixing with the other ingredients, and if calcium gluconate, $Ca(C_6H_{11}O_7)_2 \cdot H_2O$, is included in the solution, it will likewise be dissolved by heat. After the trace element stock solution has been prepared, 160 ml. of such solution is added to the basic salt solution to produce a total quantity of 100 gallons of artificial sea water.

Although the formulation set forth in table I is, in general, prepared, it is to be understood that the solid formulation is only for the purpose of supplying the desired ions when dissolved in water. Consequently, other salts, or combinations of salts, may be used as the sources of the ions as long as the same ions in similar relative proportions are provided in the solution. For example, the magnesium of the foregoing formulation may be in the form of magnesium chloride if the amount of the latter is increased by an amount equivalent to the magnesium sulfate of such formulation. The sulfate ion may then be furnished in the form of sodium sulfate in an amount equivalent to the magnesium sulfate shown in table I and the amount of sodium chloride reduced by an amount equivalent to the magnesium sulfate. Similarly, in the solution of trace elements, different anions may be employed as long as the effectiveness and concentration of the solution are not altered. Illustrative examples of such variations include the use of rubidium sulfate, aluminum chloride, copper chloride and cobalt chloride.

TABLE II

| Compound | Tolerance, percent | Percent by weight |
|---|---|---|
| NaCl | ±1 | 64.55–65.85 |
| $MgSO_4 \cdot 7H_2O$ | | 16.14–16.46 |
| $MgCl_2 \cdot 6H_2O$ | | 12.67–12.93 |
| $CaCl_2 \cdot 2H_2O$ | | 3.23–3.29 |
| KCl | | 1.72–1.76 |
| $NaHCO_3$ | | 0.495–0.505 |
| KBr | ±5 | 0.0684–0.0756 |
| $H_3BO_3$ | | 0.0589–0.0651 |
| $SrCl_2 \cdot 6H_2O$ | | 0.0446–0.0494 |
| $MnSO_4 \cdot H_2O$ | | 0.00855–0.00945 |
| $Na_2HPO_4 \cdot 7H_2O$ | | 0.00855–0.00945 |
| LiCl | | 0.0018–0.0022 |
| $Na_2MoO_4 \cdot 2H_2O$ | | 0.0018–0.0022 |
| $Na_2S_2O_3 \cdot 5H_2O$ | | 0.0018–0.0022 |
| $Al_2(SO_4)_3 \cdot 18H_2O$ | | 0.00108–0.00132 |
| RbCl | ±10 | 0.00036–0.00044 |
| $ZnSO_4 \cdot 7H_2O$ | | 0.000234–0.000286 |
| KI | | 0.000216–0.000264 |
| EDTANaFe | | 0.000171–0.000209 |
| $VOSO_4 \cdot 2H_2O$ | | 0.000144–0.000176 |
| $CoSO_4 \cdot 7H_2O$ | | 0.000117–0.000143 |
| $CuSO_4 \cdot 5H_2O$ | | 0.0000243–0.0000297 |

It has been found that especially beneficial results are obtained in handling of the composition to produce the aqueous solution and in the rate of dissolution of the ingredients if the magnesium sulfate and other ingredients which normally contain water of crystallization are in anhydrous form. Magnesium chloride which is commercially available in hydrated form contains 6 molecules of water per molecule of salt and is highly hygroscopic as well as deliquescent. Upon absorbing moisture as from the atmosphere, it begins to go partly into solution and forms a sticky mass. In the formulation used in this invention, the moisture which is required to cause this effect may be found in any of the other materials in the same package which also contain water of crystallization.

For these reasons, it is advantageous to have all of the materials of the solid composition contain a minimum of water as water of crystallization. The two constituents which most importantly should be in relatively anhydrous form are magnesium sulfate and calcium chloride. By having all of the major constituents in anhydrous form it is possible to prepare a single package of the solid materials if such materials are properly comminuted and thoroughly mixed.

It is also permissible to have a certain amount of variation in the quantity of the individual ingredients as such variation will not materially affect the suitability of the solution for the culture and maintenance of the various forms of marine life. Accordingly, the quantity of the indicated ingredients may vary as shown in the following table.

When a synthetic sea water solution is made from the composition set forth in table I, the ionic composition of the solution will be as shown in table III which follows. Table III also shows the ionic composition of solutions prepared from compositions of the ranges of ingredients set forth in table II.

TABLE III

| Ion | (1) | Concentration, p.p.m.[2] |
|---|---|---|
| $Cl^-$ | 18,400 | 18,216–18,584 |
| $Na^+$ | 10,200 | 10,098–10,302 |
| $SO_4^{--}$ | 2,500 | 2,475–2,525 |
| $Mg^{++}$ | 1,200 | 1,188–1,212 |
| $K^+$ | 370 | 366.3–373.7 |
| $Ca^{++}$ | 370 | 366.3–373.7 |
| $HCO_3^-$ | 140 | 138.6–141.4 |
| $H_3BO_3$ | 25 | 23.75–26.25 |
| $Br^-$ | 20 | 19–21 |
| $Sr^{++}$ | 8 | 7.6–8.4 |
| $PO_4^{---}$ | 1 | 0.95–1.05 |
| $Mn^{++}$ | 1 | 0.95–1.05 |
| $MoO_4^{--}$ | .6 | 0.63–0.77 |
| $S_2O_3^{--}$ | .4 | 0.36–0.44 |
| $Li^+$ | .2 | 0.18–0.22 |
| $Rb^+$ | .1 | 0.09–0.11 |
| $I^-$ | .07 | 0.063–0.077 |
| EDTA | .05 | 0.045–0.055 |
| $Al^{+++}$ | .04 | 0.036–0.044 |
| $Zn^{++}$ | .02 | 0.018–0.022 |
| $V^{++}$ | .02 | 0.018–0.022 |
| $Co^{++}$ | .01 | 0.009–0.011 |
| $Fe^{+++}$ | .01 | 0.009–0.011 |
| $Cu^{++}$ | .003 | 0.0027–0.0033 |

[1] Composition of Table I.
[2] Range of composition of Table II.

One of the principal difficulties in achieving the composition of the present invention resides in the magnesium and calcium chlorides which are necessary major basic salts. Calcium and magnesium chloride are difficult to store since they have a strong tendency to interact with the other ingredients, particularly in the high concentrations of the gross components which are used. Calcium chloride may react with the magnesium sulfate to form magnesium chloride and calcium sulfate which are relatively less soluble. To overcome such difficulties, it is necessary to be extremely careful of the moisture content of the various ingredients and particularly of the calcium chloride and/or magnesium sulfate, prior to and during storage. When the composition is dissolved in water, the calcium chloride may initially react with the magnesium sulfate to form a very slight precipitate, but the amount of such precipitate will be very small and will readily redissolve when diluted to the desired strength.

To achieve the desired borate ions in the solution a small quantity of boric acid, as shown in the aforesaid table, is included in the first part of the composition. As mentioned, the quantity of boric acid has to be carefully controlled, since the presence of this ingredient increases the hydrogen ion concentration of the solution and hence affects the pH of the solution.

The desired ferric ions are provided as a part of the solution of trace elements in the form of a chelated compound, sodium ferric ethylene diamine tetra-acetic acid, which serves as a sequestering agent for the ferric ions and precludes reaction with hydroxide or carbonate ions. The ferric ions are then available in the sea water solution to assist in promoting the growth of nitrifying bacteria which will convert the nitrogen appearing in the solution to the nontoxic nitrate form. Such chelated compound is commercially available, one source being Geigy Chemical Co. under the trade name "Sequestrene."

If calcium gluconate is included in the solution, approximately 0.0017 percent by weight, ±10 percent, will be used. This compound will be included in the solution of trace elements in the preferred two part formulation. In the solution of ions, about 0.54 to about 0.66 p.p.m. of $C_6H_{11}O_7^-$ will be present.

The artificial sea water solution and composition of this invention are suitable for use in any type of aquarium culture system, either home or commercial. The solution and composition are also suitable for use in such commercial operations as lobster houses or similar operations where it is necessary to maintain salt water marine life alive indefinitely.

Other modes of applying the principle of the invention may be employed, change being made as regards the details described, provided the features stated in any of the following claims, or the equivalent of such, be employed.

We therefore particularly point out and distinctly claim as our invention:

1. A composition which, when dissolved in water, produces an artificial sea water solution, said composition comprising a relatively homogeneous mixture of solid salts in comminuted form and a solution of trace elements, said homogeneous mixture comprising, based on the total weight of said composition, about 64.55 to about 65.85 weight percent sodium chloride, about 16.14 to about 16.46 weight percent magnesium sulfate, about 12.67 to about 12.93 weight percent magnesium chloride, about 3.23 to about 3.29 weight percent calcium chloride, about 1.72 to about 1.76 weight percent potassium chloride, about 0.495 to about 0.505 weight percent sodium hydrogen carbonate, about 0.0589 to about 0.0651 weight percent boric acid, about 0.0446 to about 0.0494 weight percent strontium chloride, about 0.00855 to about 0.00945 weight percent manganese sulfate, about 0.00855 to about 0.00945 weight percent sodium orthophosphate, about 0.0018 to about 0.0022 weight percent lithium chloride, about 0.0018 to about 0.0022 weight percent sodium molybdate, and about 0.0018 to about 0.0022 weight percent sodium thiosulfate, said solution of trace elements comprising, based on total weight of said composition, about 0.0684 to about 0.0756 weight percent potassium bromide, about 0.00108 to about 0.00132 weight percent aluminum sulfate, about 0.00036 to about 0.00044 weight percent rubidium chloride, about 0.000234 to about 0.000286 weight percent zinc sulfate, about 0.000216 to about 0.000264 weight percent potassium iodide, about 0.000171 to about 0.000209 weight percent sodium ferric ethylene diamine tetraacetic acid, about 0.000117 to about 0.000143 weight percent cobalt sulfate, and about 0.0000243 to about 0.0000297 weight percent copper sulfate.

2. The composition of claim 1 in which said magnesium sulfate is anhydrous magnesium sulfate.

3. The composition of claim 1 in which said magnesium sulfate and said calcium chloride are in anhydrous form.

4. The composition of claim 1 in which said solution of trace elements includes about 0.000144 to 0.000176 weight percent vanadyl sulfate.

5. The composition of claim 1 in which said solution of trace elements includes about 0.0015 to 0.0019 weight percent calcium gluconate.

6. A synthetic sea water solution comprising an aqueous solution having the following ionic concentration: about 18,216 to about 18,584 p.p.m. $Cl^-$, about 10,098 to about 10,302 p.p.m. $Na^+$, about 2,475 to about 2,525 p.p.m. $So_4^{--}$, about 1,188 to about 1,212 p.p.m. $Mg^{++}$, about 366.3 to about 373.7 p.p.m. $K^+$, about 366.3 to about 373.7 p.p.m. $Ca^{++}$, about 138.6 to about 141.4 p.p.m. $HCO_3^-$, about 23.75 to about 26.25 p.p.m. $H_3BO_3$, about 19 to about 21 p.p.m. $Br^+$ about 7.6 to about 8.4 p.p.m. $Sr^{++}$, about 0.95 to about 1.05 p.p.m. $PO_4^{---}$, about 0.95 to about 1.05 p.p.m. $Mn^{++}$, about 0.63 to about 0.77 p.p.m. $MoO_4^{--}$, about 0.36 to about 0.44 p.p.m. $S_2O_3^{--}$, about 0.18 to about 0.22 p.p.m. $Li^+$, about 0.09 to about 0.11 p.p.m. $Rb^+$, about 0.063 to about 0.077 p.p.m. $I^-$, about 0.045 to about 0.055 p.p.m. EDTA, about 0.036 to about 0.044 p.p.m. $Al^{+++}$, about 0.018 to about 0.022 p.p.m. $Zn^{++}$, about 0.009 to about 0.011 p.p.m. $Co^{++}$, about 0.009 to about 0.011 p.p.m. $Fe^{+++}$ and about 0.0027 to about 0.0033 p.p.m. $Cu^{++}$.

7. The solution of claim 6 including about 0.018 to about 0.022 p.p.m. of $V^{++}$.

8. The solution of claim 6 including about 0.54 to about 0.66 p.p.m. $C_6H_{11}O_7^-$.

* * * * *